United States Patent [19]

Greenwood, Jr.

[11] Patent Number: 4,494,649

[45] Date of Patent: * Jan. 22, 1985

[54] ACCUMULATING CONVEYOR

[75] Inventor: Walter Greenwood, Jr., Dearborn, Mich.

[73] Assignee: Wisne Automation & Engineering Co., Novi, Mich.

[*] Notice: The portion of the term of this patent subsequent to Feb. 9, 1999 has been disclaimed.

[21] Appl. No.: 384,482

[22] Filed: Jun. 3, 1982

[51] Int. Cl.³ .............................................. B65G 25/00
[52] U.S. Cl. ..................................... 198/718; 198/751
[58] Field of Search ............... 198/718, 751, 744, 774, 198/460

[56] References Cited

U.S. PATENT DOCUMENTS

| | | | |
|---|---|---|---|
| 3,289,821 | 12/1966 | Bosse et al. | 198/744 |
| 3,385,418 | 5/1968 | Broser | 198/221 |
| 3,500,992 | 3/1970 | Tabor et al. | 198/219 |
| 3,545,600 | 12/1970 | Rudlaff | 198/774 |
| 3,547,254 | 12/1970 | Manetta | 198/221 |
| 3,570,656 | 3/1971 | Manetta | 198/221 |
| 3,786,911 | 1/1974 | Milazzo | 198/219 |
| 3,794,158 | 2/1974 | Greenwood, Jr. | 198/718 |
| 3,888,344 | 6/1975 | Major | 198/718 |
| 4,314,630 | 2/1982 | Greenwood, Jr. | 198/718 |

FOREIGN PATENT DOCUMENTS

659472 4/1979 U.S.S.R. .............................. 198/718

Primary Examiner—Joseph E. Valenza
Assistant Examiner—Daniel R. Alexander
Attorney, Agent, or Firm—Basile, Weintraub & Hanlon

[57] ABSTRACT

An accumulating conveyor having a plurality of spaced article support stations. A plurality of conveyor modules are reciprocally mounted along the length of the conveyor, with each module being so mounted as to be movable between a pair of adjacent stations. Each module comprises a housing having a reciprocally mounted actuating rod, the outer ends of which are adapted to alternately engageably abut the outer ends of the actuating rods carried by the modules immediately ahead and behind. Article engaging levers carried by each module become operative upon movement of their associated actuating rods to engage an article in one of the associated support stations to transfer the article to the next advanced or forward station when the modules are reciprocated towards the unload station. Each support station has a sensing arm rotatably affixed thereto which detects the presence or absence of an article in the next advanced station. The sensing arm cooperates with an externally mounted actuating lever carried by the module to activate the transfer mechanism in each module which causes reciprocal movement of the actuating rod and raises the article engaging arms to an operative position when the next advanced station is empty. The actuating rod of a module abuts and reciprocates the actuating rod of the next rearward module to place the rearward module and all succeeding rearward modules in an operative state causing all articles in the support stations behind an empty station to be advanced forward one station as the modules are reciprocated.

8 Claims, 7 Drawing Figures

ACCUMULATING CONVEYOR

BACKGROUND OF THE INVENTION

1. Field of the Invention

This invention relates, in general, to conveyors adapted to convey articles or work pieces and, more particularly, to conveyors of the mechanical accumulating type.

2. Description of the Prior Art

Conveyors and, in particular, conveyors of the accumulating type are well known and have been employed in many manufacturing operations. In such conveyor systems for supplying articles to assembly stations it has been a practice to provide a multiplicity of stations together with means for advancing articles from station to station. Initially, means were provided that were responsive to the presence or absence of an article at each station such that when an empty station was sensed, an article was advanced from the next rearmost station to fill this empty station. This resulted in vacating the previous station with a sequence of operations being required to move rearmost articles forward and the empty station itself was moved back to the beginning of the line and eventually was eliminated by loading the conveyor at that point with a new article. For various reasons, articles are removed from intermediate stations between the loading and delivery stations along the conveyor and it is necessary that the conveyor function automatically to advance articles from the load end in order to maintain each station in a filled condition at all times. It is particularly desirable to accomplish the foregoing results by a complete mechanical sensing control and actuating means which is not subject to the unavoidable failures encountered with electrical or electronically controlled systems.

A typical conveyor system which performs the aforementioned operation may take the form of a pair of elevated and spaced parallel support frames having equally spaced support stations on which the articles are disposed. A suitable conveyor, such as a reciprocating or walking beam type, is adapted to start from an initial position at the beginning of its stroke and engage the articles, move the articles forward to the next position wherein the conveyor system disengages the articles and, finally, returns to its initial position. Generally, such systems may comprise a sensing means positioned at each station and, if the station is empty, the sensing means will position itself into an operating mode and cooperate with a suitable mechanism which will engage the articles to achieve the necessary advancement.

In such a conventional conveyor, the sensing means, typically a lever arm, is affixed to the stationary support frame at each article support station. During the forward and reverse strokes of the conveyor, the parts are slid along a frame between each support station.

It is also known to provide a lift and carry type of conveyor to lift articles over interfering plant equipment or to prevent sliding contact between the articles and the conveyor support rails. In this type of conveyor, a suitable mechanism is incorporated into the conveyor drive which initially raises the entire conveyor a predetermined distance to lift the articles off of the support rails before the forward stroke is initiated. At the end of the forward stroke, the conveyor is lowered to deposit the articles in the next advanced position along the support rails. However, since the entire conveyor is raised and lowered as a unit, no accumulation of the articles in the forwardmost positions on the conveyor can be achieved.

Thus, it would be desirable to provide an accumulating conveyor which provides lift and carry features. It would also be desirable to provide an accumulating conveyor which is designed to prevent the occurrence of a false article presence indication in a support station. Finally, it would be desirable to provide an accumulating conveyor which incorporates a simplified mechanism for transferring the articles between successive support stations.

SUMMARY OF THE INVENTION

There is disclosed herein an accumulating conveyor comprising a plurality of longitudinally spaced carrier modules which become operative when reciprocated relative to a plurality of spaced article support stations and which are adapted to engage the articles carried by the support stations and advance them intermittently from a load station to an unload station. Each module is a self-contained, self-lubricating mechanism. A means for sensing the presence of an article in the next advanced station is provided in each support station. Means are carried by each module for transferring the articles to the next advanced station. Means for actuating the transferring means cooperate with the sensing means to position the associated transferring means in an operative condition when the next advanced support station is empty. The actuating means comprises a reciprocating rod means having its opposite ends extending outwardly from its associated module for positioning into an operative condition the transfer means of all rearward modules behind the module whose transfer means has become operative.

The unique conveyor of this invention incorporates a simplified mechanism for transferring articles from station to station as the modules are reciprocated. In addition, a lift and carry feature can be incorporated into any module along the conveyor by merely changing the shape of the article engaging means. This unique feature enables certain modules to be of the lift and carry type while other modules merely push the articles from station to station. Heretofore, in prior art conveyor systems, the entire conveyor, including all of the support stations, was initially lifted upward before the articles were carried to the adjacent stations. Finally, means are provided for preventing the occurrence at a false article presence indication in a support station so as to improve the efficiency and reliability of the conveyor system of the present invention.

BRIEF DESCRIPTION OF THE DRAWING

The various features, advantages and other uses of this invention will become more apparent by referring to the following detailed description and drawing in which.

DESCRIPTION OF THE PREFERRED EMBODIMENTS

Throughout the following description and drawing, identical reference numbers are used to refer to the same component shown in multiple figures of the drawing.

Figure 1:
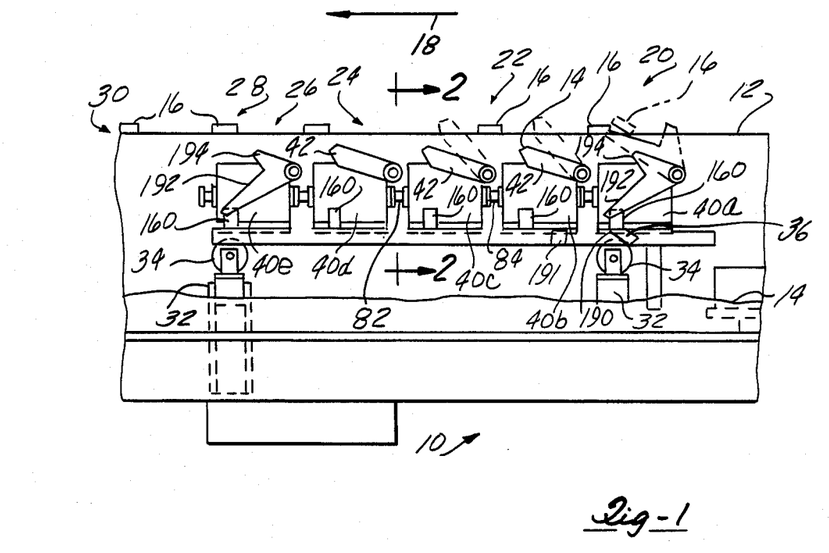
FIG. 1 is a fragmentary, elevational view of an accumulating conveyor constructed in accordance with the teachings of this invention.
Figure 2:
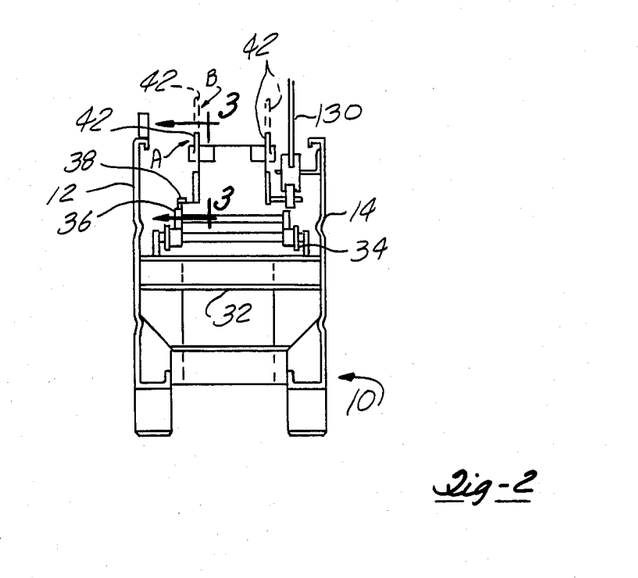
FIG. 2 is a fragmentary, cross-sectional view of the accumulating conveyor, generally taken along line 2—2 in FIG. 1.

Referring now to the drawing and, in particular to FIGS. 1 and 2, there is depicted a simplified version of an accumulating conveyor 10 constructed in accordance with the teachings of this invention. The conveyor 10 comprises two parallel and elevated frames 12 and 14 having a plurality of spaced support stations on which articles 16 are transferred from the right to the left, as indicated by the arrow 18 in FIG. 1. The present conveyor 10 is illustrated as having four intermediate article support stations 22, 24, 26 and 28 between a load station 20 and an unload station 30. The article support frames 12 and 14 are interconnected by transverse beams 32 which have at their top end rollers 34 that provide a sliding support for a longitudinal carrier support member 36 which may be reciprocated along the longitudinal axis of the frames 12 and 14 by any suitable means, such as a hydraulic cylinder or the like. Carrier support member 36 has fixedly mounted to the top surface thereof by means of fasteners 38, shown in FIG. 2, a plurality of longitudinally aligned identical conveyor modules 40a thru 40e. Since the conveyor modules 40a-e are each identical in construction, only one will be described in detail hereafter; however, it will be understood that the description of one is equally applicable to the other conveyor modules. The conveyor modules 40a-e carried by the carrier support member 36 are reciprocated as a unit relative to the support stations and are adapted to engage the articles 16 carried by the support frames to advance the articles 16 to the next forward support station.

Each of the conveyor modules 40a-e has article engaging means, such as a pair of fingers 42, which are movable between a first position A wherein the fingers 42 are in a lowered position and will not engage the articles 16 in their associated module, and a second position B wherein the upper face 44 of each raised article engaging finger 42 is adapted to engage the article 16 in its associated support station and move the article 16 to the next advance support station as its associated module is moved relative to the frames 12 and 14.

Figure 3:
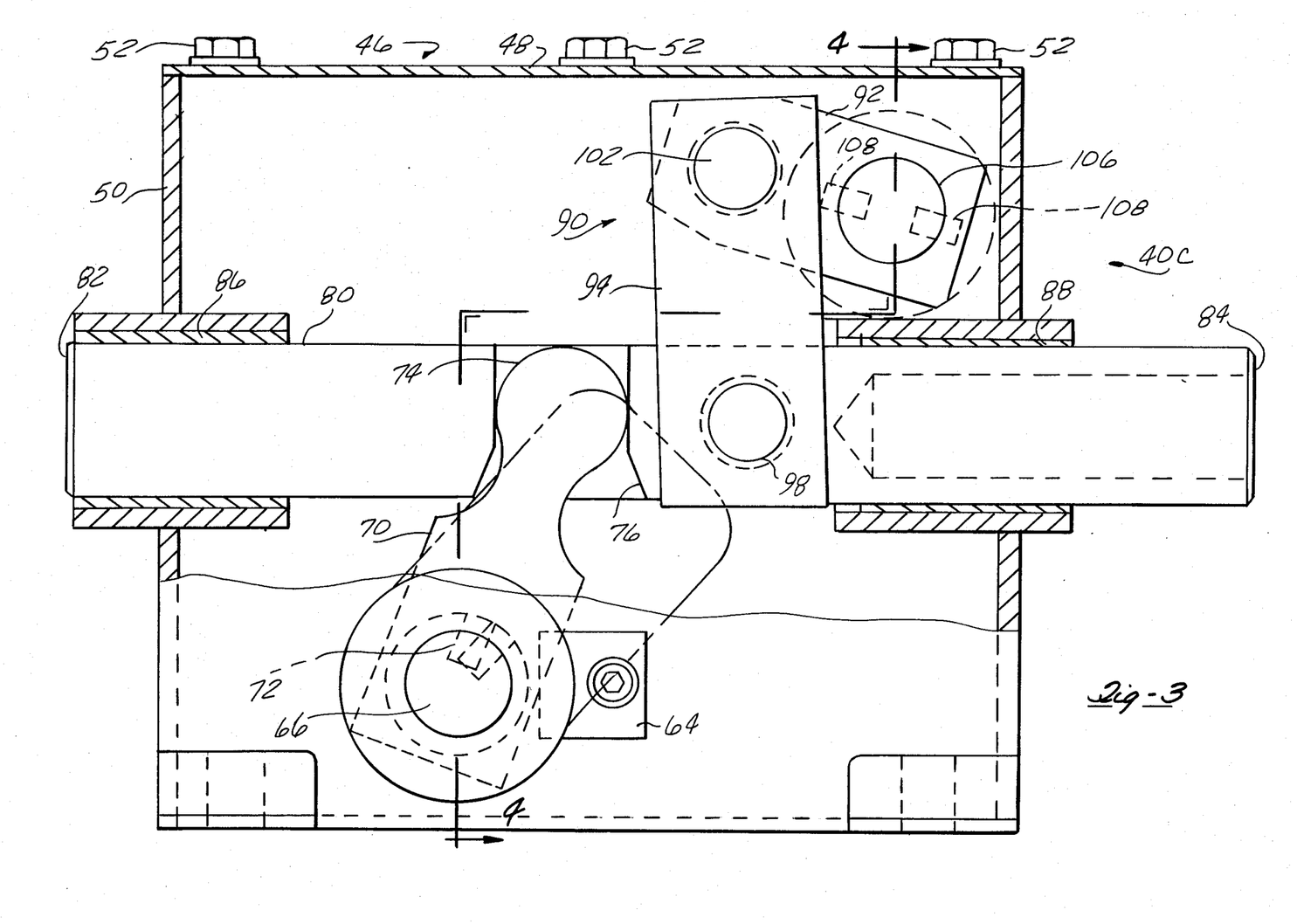
FIG. 3 is an enlarged, partially sectional, cross sectional view, generally taken along line 3—3 in FIG. 2.
Figure 4:
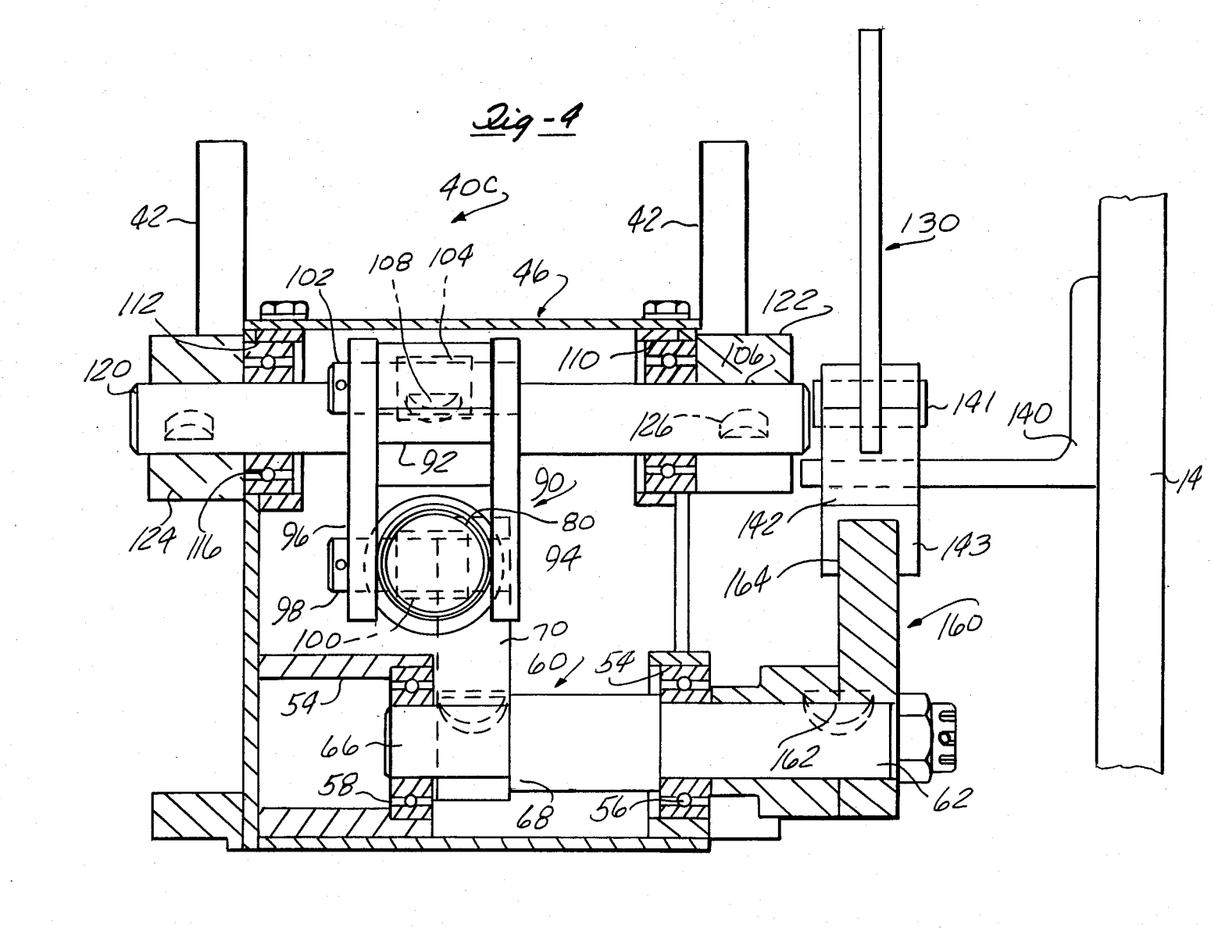
FIG. 4 is a cross-sectional view generally taken along line 4—4 in FIG. 3.

Referring now to FIGS. 3 and 4, the module 40c is illustrated as comprising an enclosed hollow housing 46 having a top access cover 48 and a side cover 50 secured to the housing 46 by any suitable means, such as by bolts 52. The covers 48 and 50 permit access into the interior of the enclosed housing 46 to permit assembly and lubrication of the internal mechanism.

With particular reference to FIG. 4, the housing 46 is shown as having a pair of internal recesses or support sleeves 54 which fixedly mount ball bearings 56 and 58. A keeper 64, shown in FIG. 3, which may be in the form of a block, is secured to the exterior of the housing 46 to hold the ball bearing 56 in position within the recess 54.

A shaft 60 has one end, shown generally by reference number 62, which extends externally out of the housing 46. The end portion 62, as well as an opposed end portion 66 of the shaft 60, are constructed of a first reduced diameter, while an intermediate section 68 has an enlarged diameter.

A first link 70 is fixedly secured to the second end portion of the shaft 60 by suitable means, such as a woodruff key and slot arrangement 72. In this manner, the link 70 rotates as a unitary member with the rotation of the shaft 60, by the means described in greater detail hereafter. The link 70, which is illustrated in a position to raise the article engaging means 42, has an end portion 74 which fits within a slot 76 formed in an actuating rod 80. The actuating rod 80 is disposed transverse to the shaft 60 and has opposed ends 82 and 84 which are slidably mounted in bushings 86 and 88, respectively, such that the outer ends 82 and 84 of the rod 80 extend forwardly and rearwardly of the conveyor module 40c. The actuating rod 80 is thus mounted for reciprocating movement forward and rearward of the module 40c. This reciprocating movement is imparted to the actuating rod 80 by means of the link 70 which rotates upon the rotation of the shaft 60 as described above. The rotary motion of the link 70 is translated through the end portion 74 to linear movement of the actuating rod 80 within the bushings 86 and 88.

A pair of pivotably connected link assemblies 90 and 92 are associated with the actuating rod 80. The first link assembly 90 comprises first and second, spaced link members 94 and 96. The link members 94 and 96 are pivotably connected to the actuating rod 80 by means of a cylindrical shaft 98 having a bearing 100 mounted thereto which extends through the first ends of the link members 94 and 96 and the acutating rod 80. In this manner, the link members 94 and 96 are free to pivot about their respective first ends as the actuating rod 80 reciprocates forward and rearward. The link members 94 and 96 are connected at their opposite ends to the first end of the second link member 92 by a similar shaft 102 which also has a bearing 104 centrally mounted thereon. The shaft 102 extends through the link members 94 and 96 and the centrally disposed link 92 to pivotably connect the link members together such that the link membes 92, 94 and 96 pivot about the shaft 102 as the actuating rod 80 is reciprocated.

The second end of the link 92 is fixedly secured to a second shaft or rod 106 by suitable means, such as a woodruff key and slot arrangement 108, shown in FIG. 3. The shaft 106 extends transversely to the actuating rod 80 and parallel to the first shaft 60. The shaft 106 extends through the recesses 110 and 112 in the housing 46 which fixedly hold bearings 114 and 116 such that the rod or shaft 106 is freely rotatable therein. In addition, the shaft 106 has opposed ends 118 and 120 which extend externally from the housing 46.

Since the second link 92 and the shaft 106 are fixedly secured together, rotation of the link 92 will impart a rotational movement to the shaft 106. As viewed in FIG. 3, in which the components are positioned such that the article engaging means 42, described in greater detail hereafter, are in a raised or extended position, rotation of the link 70 in a counter-clockwise direction, as viewed in FIG. 3, will impart a linear movement to the actuating rod 80 causing it to move to the left. The first end of the link 90 will similarly move to the left, with the link 90 pivoting about the shaft 98. The second link 92 will similarly pivot with respect to the first link 90 about the shaft 102 and will move in a counter-clockwise direction. This will impart a counter-clockwise rotary motion to the shaft 106 which has the effect of lowering the article engaging means 42. A reverse movement of the shaft 60 and link 70 will cause the components to move in a reverse manner to raise the article engaging means 42.

As shown in FIG. 4, block members 122 and 124 are fixedly secured to the opposed ends 118 and 120, respectively, of the shaft 106 by suitable means, such as a woodruff key and slot arrangement 126. The block members 122 and 124 serve as a base for the article engaging means 42, which in the preferred embodiment is in the form of opposed fingers which are secured to the block members 122 and 124 by any suitable means, such as by welding.

Figure 5:
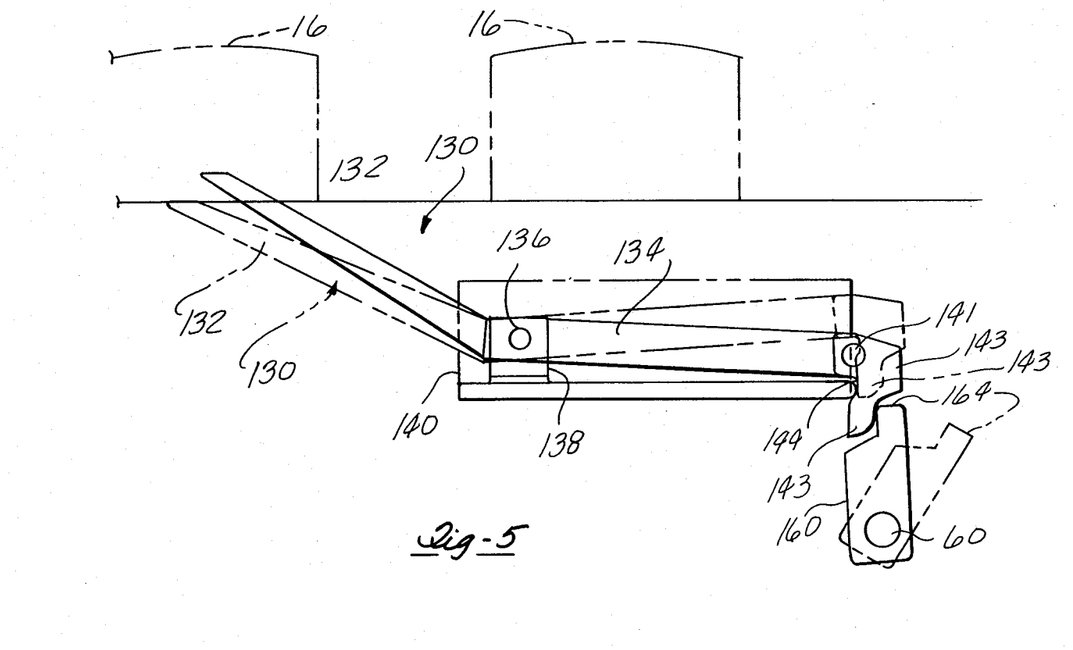
FIG. 5 is an enlarged fragmentary view of the accumulating conveyor illustrated in FIG. 1.

The accumulating conveyor 10 of the present invention further includes means for sensing the presence of an article 16 in each support station, as shown in FIGS. 4 and 5. The sensing means comprises an article sensing means 130 in each support station. The article means 130 is adapted for pivotal movement between a first raised position, as shown in FIG. 5 in solid, to a second lowered position, shown in phantom.

The article sensing means 130 comprises an elongated finger having an upwardly inclined arm portion 132 and an elongated horizontally extending body portion 134. The article sensing means 130 is carried on a bearing shaft 136 which extends between opposed angle brackets 138 and an intermediate portion of the article sensing means 130. The angle brackets 138 are mounted on the horizontally extending leg of an angle bracket 140 which is secured to the frame 14.

A member 142 is pivotally connected to the article sensing means at one end of the body portion 134 by means of a shaft 141. The member 142 extends downward below the article sensing means 130 and terminates in a depending portion 143. A central notch 144 is formed at a forward end of the member 142 as shown in FIG. 5. In addition, the member 142 is adapted for movement with the article sensing means 130 from a first, lower position indicated in solid in FIG. 5 to a raised position depicted in phantom.

The sensing means 130 cooperates with an actuating lever 160 which is fixedly secured to the end portion 62 of the shaft 60 by suitable means, such as a woodruff key and slot arangement 162, as shown in FIG. 4. The actuating lever 160 has an upstanding, notched finger portion 164. The finger portion 164 is adapted to be abutted by the depending portion 143 of the member 142 so as to impart rotary movement to the actuating lever 160 which is translated to rotation of the shaft 60, as described in greater detail hereafter.

In operation, when no article 16 is in the next advanced support station, the sensing lever 130 will assume the position shown in solid in FIG. 5 in which the upper end portion is in the extreme vertical or raised position. When in this position, the notch 144 in the member 142 attached to the end of the body portion 134 of the sensing arm 130 will engage the end of the angle bracket 140 which operates to prevent any vertical movement of the member 142. During forward movement of the modules, the depending end 143 of the member 142 will abut the finger portion 164 of the actuating lever 160 causing rotation of the actuating lever 160 to the position indicated in phantom in FIG. 5.

During such rotation, the actuating lever 160 causes similar clockwise rotation of the shaft 60 within the housing 46 of the module 40c. As described previously, rotation of the shaft 60 will result in movement of the actuating rod 80 and the links 90 and 92 which will result in the elevation of the article engaging means 42 which will engage the article 16 in the present support station and advance the article 16 to the next advance support station on the accumulating conveyor 10.

When an article 16 is in the next advance station, the article 16 will cause the upper end portion of the article sensing means 130 to be lowered to the position shown in phantom in FIG. 5. In such a position, the member 142 will be raised to the position shown in phantom in FIG. 5 above the bottom leg of the angle bracket 140. In this position, there will be no engagement between the depending portion 143 of the member 142 and the finger portion 164 of the actuating lever 160 as the module 40c is advanced in the forward direction to the left as viewed in FIG. 5. Thus, no rotation of the actuating lever 160 and the shaft 60 attached thereto will occur. As a result, the article engaging means 42 will remain in the lowered position such that the article 16 in the present support station is not advanced to the next support station which is already occupied by another article 16.

Referring briefly to FIG. 1, the general operation of the entire conveyor 10 will now be described. Each conveyor module 40a–e is associated with one support station on the conveyor 10. Thus, conveyor module 40a is associated with the load station 20, conveyor module 40b is associated with the first intermediate station 22 and modules 40c–40e are respectively associated with the remaining support stations 24, 26 and 28. When the article engaging means 42 of the first conveyor module 40a is in the raised position, the article engaging means 42 will engage the article 16 in the load station 20 when the carrier support 36 is reciprocated to the left, as viewed in FIG. 1, and the article 16 will be transferred to the next advanced support station 22. Simultaneously therewith, the article engaging means 42 carried by the second conveyor module 40b when in a raised position will engage the article 16 located in the article support station 22 and move it forwardly to the next adjacent station 24. Likewise, the article engaging means 42 associated with the modules 40c, 40d and 40e will engage the articles 16 carried respectively in the article support stations 24, 26 and 28 and move them forwardly to support stations 26, 28 and 30, respectively. In the event that a particular support station is empty, such as support station 24, it is necessary that the articles disposed rearward of the empty support station be moved in a forward direction with the articles forward of the empty station remaining in place. This selective advancement is achieved in the following manner. When a station is sensed to be missing an article, as described above with reference to FIG. 5, upon the initial movement of the modules, rotary motion will be imparted to shaft 60 within the housing through cooperation of the article sensing means 130, the member 142 and the actuating lever 160. This will activate the transferring means without the housing 46 to elevate the associated article engaging means 40 to the raised position as described above. In so doing, the actuating rod 80 which will be reciprocated to the right, as viewed in FIG. 3, to elevate the article engaging means 42 and serves as a means for actuating the transferring means of all the rearward conveyor modules.

As shown in FIG. 1, the opposed ends 82 and 84 of the actuating rod 80 associated with the conveyor module 40c extend outward from the conveyor module 40c and abut the corresponding ends of the actuating rods within the adjacent conveyor modules 40b and 40d. Thus, when the actuating rod 80 reciprocates, such reciprocation is imparted to the actuating rods of the adjacent modules. Since the actuating rod 80 within the conveyor module 40c is initially moved to the right, as viewed in FIG. 3, to raise its associated article engaging means 42, only the rearward conveyor modules 40b and 40a will be actuated and their associated article engaging means 42 elevated so as to advance rearward of empty support station 24 forward one station.

As shown in FIG. 1, means are provided for resetting the transferring means of all of the conveyor modules 40a–40e immediately at the completion of the forward travel of the carrier support 36. The actuating lever 160 on the first conveyor module 40a is provided with a depending flange portion 190. The flange portion 190 cooperates with a stop member 191 secured to the support frame 12 so as to rotate the actuating lever 160 counter-clockwise which has the effect through the internal transferring mechanism of each conveyor module 40 to retract the article engaging means 42 to the lowered position for the return travel of the conveyor modules to the start position.

An additional embodiment of the construction of the article engaging means is also illustrated in FIG. 1. As shown therein, the article engaging means 42 in the carrier modules 40b, 40c and 40d are configured such that the end portion will abut the rear of the article 16 so as to push the article 16 to the next advanced support station. However, the article engaging means associated with the conveyor modules 40a and 40e are depicted as having an elongated base portion 192 and rear support 194 which is adapted to lift and carry an article 16 between support stations. In operation, as the article engaging means 42 are rotated to the elevated position, the base 192 will pick up the article 16 from the associated support station and raise it off of the support frames 12 and 14. At the end of the forward travel of the conveyor module, the article engaging means 42 will be retracted to a lowered position, as described above, at which time the article 16 will be deposited on the frame supports 12 and 14 in the next advanced support station. This has the advantage of lifting the article from the support frames during the forward travel which prevents abrasion of the article or enables the article to be lifted over the interfering plant equipment. In addition, the unique design of the conveyor modules enables lift and carry functions to be incorporated into any desired station within the conveyor 10. Previous lift and carry conveyor systems require the entire conveyor, including all of the individual stations, to be raised and lowered as a unit.

Figure 6:
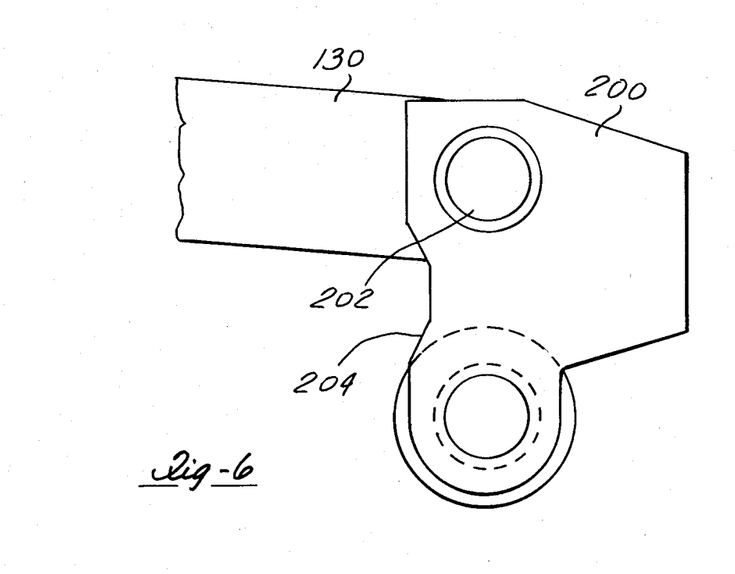
FIG. 6 is a partial elevational view similar to FIG. 5, of another embodiment of the accumulating conveyor of the present invention.
Figure 7:
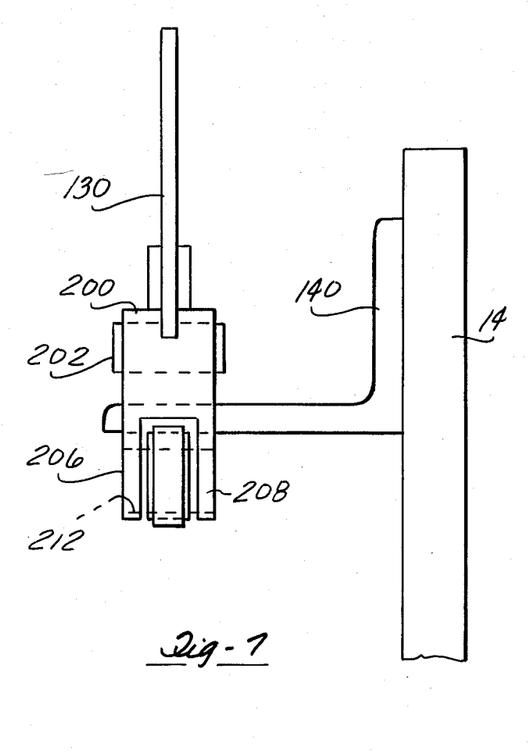
FIG. 7 is a right hand side view of the embodiment of the present invention illustrated in FIG. 6.

Another embodiment of the present invention is illustrated in FIGS. 6 and 7. In this embodiment, a member 200 is mounted at the end of the article sensing means 130 and functions in the same manner as member 142 illustrated in FIGS. 4 and 5 to activate the article engaging means 42. The member 200 is pivotally mounted at the end of the article sensing means 130 by means of a bearing shaft 202. As with the member 142 illustrated in FIGS. 4 and 5, the member 200 depicted in FIGS. 6 and 7 has a central notch 204 formed at a forward end thereof which functions in the same manner as the notch 144 and the member 142 shown in FIG. 5 to prevent inadvertent vertical movement of the member 200 when the member 200 abuts the bottom leg of the angle bracket 140 upon forward movement of the modules.

Member 200 is formed with a depending portion in the form of two spaced leg members 206 and 208 which are spaced apart to define a space therebetween. A roller 210 is rotatably mounted between the legs 206 and 208 on a bushing 212 which is supported in a central aperture formed in each of the legs 206 and 208. The roller 210 functions to provide controlled elevation of the article engaging means 42. This is achieved since the roller 210 provides a smooth constant surface when it engages the actuating lever 160 and moves the lever 160 at a constant controlled rate to smoothly elevate the article engaging means 42.

In summary, there has been disclosed herein a new and improved accumulating conveyor having a plurality of individual modules associated with each support station. An article sensing member adapted to detect the presence of an article in the next advanced support station is mounted in each support station. The modules further include a reciprocally mounted actuating rod, the outer ends of which are adapted to engage the corresponding ends of the actuating rods in the adjacent modules. The actuating rod is reciprocated through the cooperation of the sensing member and transferring means carried by each module so as to raise the article engaging members carried by the module to an elevated position to advance an article to the next support station and at the same time to trigger the corresponding actuating rods of the rearward conveyor modules to advance articles from the rearward support stations forward.

What is claimed is:

1. An accumulating conveyor comprising:
   a longitudinal frame having a plurality of spaced article support stations through which articles are advanced intermittently from a load station to an unload station on said frame;
   support means reciprocally carried by said frame;
   a plurality of longitudinally spaced conveyor modules mounted on said support means, each module being associated with one of said article support stations and comprising an enclosed housing;
   means for reciprocating said support means and said modules mounted thereon in back and forth strokes such that said modules move between their associated support stations and the adjacent advanced support station;
   means, associated with each article support station, for sensing the presence of an article in the adjacent advanced article support station, said sensing means being pivotally mounted on said frame;
   means, carried externally on each module, for engaging an article in the associated support station, said article engaging means being movable between a lowered, inoperative position and an elevated article engaging position;
   means, within each module housing, for transferring said associated article engaging means between lowered and elevated positions; and
   means, carried within each module housing, for actuating said associated transferring means, said actuating means including a reciprocating rod having its opposite ends extending outward from said housing;

said transferring means further including first means in said housing for moving said reciprocating rod, said first moving means comprising;

a first shaft rotatably carried within said housing and having a first end extending externally therefrom;

an actuating member being fixedly secured to said first shaft exteriorly of said housing; and means, connected to said first shaft for movement therewith, for connecting said first shaft to said reciprocating rod so as to transfer rotational movement of said first shaft to said reciprocating rod;

a member pivotally connected to one end of the article sensing means and movable therewith between raised and lowered positions;

a stop member secured to said frame and adapted to engage said member when said member is in the lowered position as said modules move in a forward direction;

said stop member holding said member in a fixed position when said member is in the lowered position such that said member engages and causes pivotal movement of said actuating member;

said pivotal movement of said actuating member causing rotation of said first shaft;

said member including means for preventing vertical movement of said member after it has engaged said stop member;

said actuating means being responsive to said associated sensing means to position the associated transferring means in an operative condition when said modules are reciprocated in a forward direction and when said adjacent advanced station is empty to move said article engaging means to an elevated position to engage the article in the associated support station and to transfer said article from said associated support station to the adjacent advanced support station;

said actuating means being further responsive to said sensing means for positioning into an operative condition said actuating means of all modules therebehind when the adjacent advanced support station is empty.

2. The accumulating conveyor of claim 1 wherein the means for preventing vertical movement of said member comprises:

a notch formed on the forward edge of said member and adapted to receive an end of said stop member.

3. The accummulating conveyor of claim 1 wherein said member has a lower depending portion having an inclined surface engageable with said actuating member.

4. The accummulating conveyor of claim 1 wherein said member has a lower depending portion and roller means rotatably mounted on the lower depending portion for engagement with said actuating member.

5. An apparatus for selectively activating the means for transferring an article engaging means mounted on a plurality of reciprocal modules in an accumulating conveyor between raised and lowered positions in response to the presence of articles in article support stations in which pivoting of an actuating member mounted on each module activates the transferring means within each module to raise the associated article engaging means, the apparatus comprising:

means, associated with each article support station, for sensing the presence of an article in the adjacent advanced article support station;

a member pivotally mounted on the end of each article sensing means and movable with said article sensing means between raised and lowered positions;

a stop member secured to the accumulating conveyor and adapted to engage said member when said member is in the lowered position as said modules move in one direction;

said stop member holding said member in a fixed position when said member is in the lowered position such that said member engages and causes pivotal movement of said actuating member; and said member including means for preventing vertical movement of said member after it has engaged said stop member.

6. The apparatus of claim 5 wherein the means for preventing vertical movement of said member comprises:

a notch formed on the forward edge of said member and adapted to receive an end of said stop member.

7. The apparatus of claim 5 wherein said member has a lower depending portion having an inclined surface engageable with said actuating member.

8. The apparatus of claim 5 wherein said member has a lower depending portion and roller means mounted on said lower depending portion for engagement with said actuating member.

* * * * *